United States Patent [19]
Sloan

[11] Patent Number: 5,483,061
[45] Date of Patent: Jan. 9, 1996

[54] GAMMA RAY SCINTILLATION DETECTOR APPARATUS AND METHOD FOR REDUCING SHOCK INDUCED NOISE

[75] Inventor: William R. Sloan, Missouri City, Tex.

[73] Assignee: Schlumberger Technology Corporation, Sugar Land, Tex.

[21] Appl. No.: 303,109

[22] Filed: Sep. 7, 1994

[51] Int. Cl.⁶ ............................................. G01V 5/12
[52] U.S. Cl. .................. 250/254; 250/262; 250/269.3; 250/369
[58] Field of Search ............................ 250/369, 262, 250/254, 261, 269.3

[56] References Cited

U.S. PATENT DOCUMENTS 3,013,156  12/1961  Hearn ............................ 250/265
5,023,450  6/1991  Gold ............................. 250/254

*Primary Examiner*—Carolyn E. Fields
*Attorney, Agent, or Firm*—Gary L. Bush; Wayne I. Kanak

[57] ABSTRACT

A method and apparatus is disclosed for distinguishing gamma ray induced pulses from shock induced pulses of a scintillation detector used in logging while drilling tools. The method and apparatus identifies detector pulses which occur within a predetermined time interval from a previous pulse as shock induced pulses and identifies pulses that occur after a predetermined time interval from a previous pulse as gamma ray induced pulses.

19 Claims, 4 Drawing Sheets

GAMMA RAY SCINTILLATION DETECTOR APPARATUS AND METHOD FOR REDUCING SHOCK INDUCED NOISE

BACKGROUND OF THE INVENTION

1.) Field of the Invention

This invention relates generally to apparatus for logging while drilling and more particularly to logging while drilling tools which include gamma ray scintillation detectors for measuring the natural radioactivity of geological formations surrounding a borehole.

2.) Description of the Prior Art

Gamma ray sensing instruments including a sodium iodide (NaI) crystal in combination with a photo multiplier tube (PMT) have been used for many years to sense and count the number of gamma rays striking a measurement tool in a borehole. Such instruments have been used with great success in open hole logging tools to measure the extent of natural radioactivity of earth formations which surround the borehole. When such gamma ray sensing instruments are used in a logging while drilling (LWD) environment, however, tremendous shocks are imparted to the housing of the LWD tools. Such shocks can induce voltage pulses from the detector that have pulse amplitudes similar to the amplitudes generated by gamma rays striking the detector.

The art of engineering shock absorbing mechanical mountings for NaI crystals and PMT's has found that it is difficult and expensive to build gamma ray detectors which limit shock induced voltage pulses to a few pulses or "counts" per shock. Furthermore, experience teaches that a gamma ray detector may exhibit low shock induced count rates when it is first put in service; but, after field use, the shock count rate increases.

IDENTIFICATION OF OBJECTS OF THE INVENTION

A primary object of this invention is to provide a method and apparatus for a gamma ray detector to distinguish gamma ray pulses from shock induced pulses.

Another object of this invention is to provide a method and apparatus for a gamma ray detector, used in a tool to measure natural radioactivity of earth formations surrounding a borehole, by which shock induced pulses which are counted are minimized, so as to maximize the probability that if a detector pulse is counted, it is a gamma ray induced pulse and not a shock induced pulse.

SUMMARY OF THE INVENTION

The objects identified above, as well as other features and inventions are provided in a method and apparatus which is based upon the recognition of the fact that it is difficult to distinguish gamma ray induced pulses and shock induced pulses on the basis of the amplitude of such pulses, because true gamma ray pulses of a NaI-PMT detector are about the same amplitude as pulses which are shock induced. It has been discovered for certain applications of NaI-PMT apparatus, especially for measurement of natural radioactivity of formations surrounding a borehole, that gamma rays are usually separated in time by a certain time interval, whereas shock induced pulses usually occur in groups within such time interval.

Based upon such discovery, apparatus and a method are provided by which detector pulses are actually counted as true gamma ray counts only if a detector pulse has occurred after a predetermined time interval has elapsed after a previous pulse has occurred. The apparatus is provided such that if a detector pulse is produced within such predetermined time interval, such time interval begins again for determining whether or not a subsequent detector pulse is a gamma ray pulse to be counted or a shock induced pulse which is not to be counted.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which.

DESCRIPTION OF THE PREFERRED EMBODIMENTS

Figure 1:
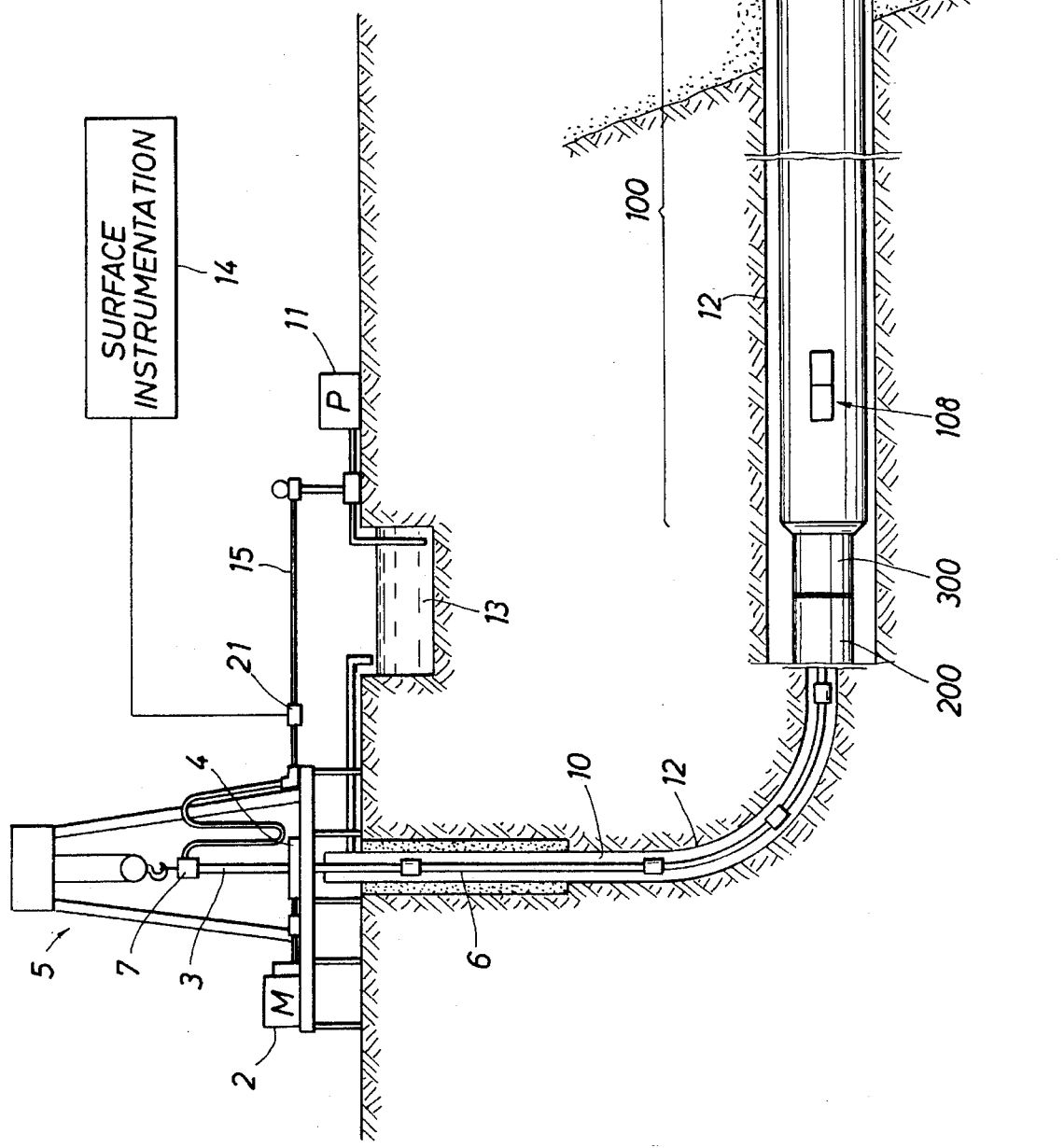
FIG. 1 illustrates a logging while drilling tool and assembly of a drilling system having a gamma ray detector especially adapted to measure the natural radioactivity of formations surrounding a borehole.

FIG. 1 illustrates a logging while drilling (LWD) tool 100 connected in tandem with a drilling assembly including drill bit 50. Such tool 100 includes a gamma ray detector assembly 108 for measurement of gamma rays produced by naturally radioactive elements of the surrounding formations 8. The detector assembly 108 is electrically connected to an electronics module 300 which may be a separate "sub" as illustrated or may be disposed in the body of LWD tool 100. A communication sub 400 is also provided as illustrated in the drilling assembly.

The LWD tool 100 is shown for illustration purposes as being in an inclined portion of a borehole at the end of a drill string 6 which turns in a borehole 12 which is formed in formation 8 by penetration of bit 50. Of course the drilling system of FIG. 1 may be used in a vertical borehole. A drilling rig 5 turns drill string 6. Drilling rig 5 includes a motor 2 which turns a kelly 3 by means of a rotary table 4. The drill string 6 includes sections of drill pipe connected end-to-end to the kelly 3 and turned thereby. The MWD tool 200, electronics module 300 and the LWD tool 100 and communication sub 400 are all connected in tandem with drill string 6. Such subs and tools form a bottom hole drilling assembly between the drill string 6 of drill pipe and the drill bit 50.

As the drill string 6 and the bottom hole assembly turn, the drill bit 50 forms the borehole 12 through earth formations 8. Drilling fluid or "mud" is forced by pump 11 from mud pit 13 via stand pipe 15 and revolving injector head 7 through the hollow center of kelly 3 and drill string 6, and the bottom hole drilling assembly to the bit 50. Such mud acts to lubricate drill bit 50 and to carry borehole cuttings or chips upwardly to the surface via annulus 10. The mud is returned to mud pit 13 where it is separated from borehole cuttings and the like, degassed, and returned for application again to the drill string 6.

The communication sub 400 receives output signals from sensors of the LWD tool 100 and from computers in the downhole electronics module 300 and MWD tool 200. Such communications sub 400 is designed to transmit coded acoustic signals representative of such output signals to the surface through the mud path in the drill string 6 and downhole drilling assembly. Such acoustic signals are sensed by transducer 21 in standpipe 15, where such acoustic signals are detected in surface instrumentation 14. The communication sub 400, including the surface instrumentation necessary to communicate with it, are arranged as the downhole and surface apparatus disclosed in U.S. Pat. Nos. 4,479,564 and 4,637,479, which patents are incorporated herein by reference.

The communication sub 400 may advantageously include the communication apparatus disclosed in U.S. Pat. No. 5,237,540. Such patent is assigned to the assignee of this application and is incorporated herein by reference.

Figure 2:
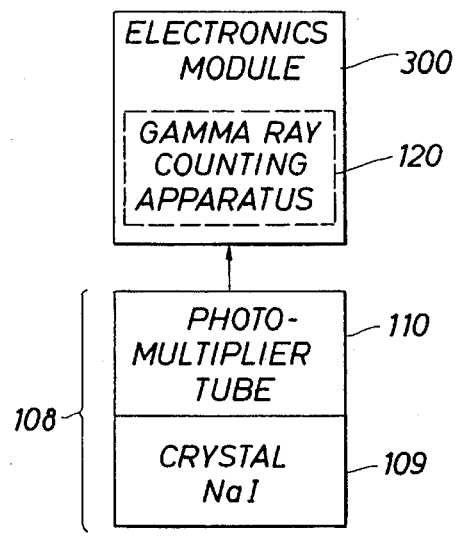
FIG. 2 schematically illustrates a NaI scintillation crystal and a PMT forming a detector for providing voltage pulses to an electronics module of an LWD assembly.

The gamma ray scintillation detector 108 including a NaI crystal 109 and photo multiplier tube (PMT) 110 of FIG. 2, when used in a logging while drilling environment, is subject to high mechanical shocks. Such shocks can induce voltage pulses from the detector that have amplitudes similar to pulses induced by gamma rays.

For a wide variety of tools used in logging while drilling natural gamma ray measurements, the number of counts recorded by a gamma ray detector varies from a few counts per second to a few ;hundred counts per second. It is not uncommon for logging while drilling tools to receive several mechanical shocks per second at levels exceeding several hundred g's while drilling in hard rock formations. Hence, if each mechanical shock applied to the detector only generates a few, e.g., 2 to 10 voltage pulses, a significant bias can be added to the gamma ray countrate. Such bias results in an incorrect gamma ray activity being assigned to the formation surrounding the borehole and, without correction, reduces the commercial value of the data.

The fundamental problem in discriminating between detector events induced by gamma rays and shock is that both produce detector voltage pulses of similar amplitude. However, it has been discovered that there is a distinct difference in the probability that two or more pulses are detected in a short time interval. It has been discovered by experimentation that pairs of shock induced counts are highly correlated in time. Typically, if a shock induced count occurs, a second count will follow in several tens of microseconds. Just the opposite is true for the arrival times of gamma ray induced detector pulses. Gamma ray emissions by a radioactive source are well known to be uncorrelated, producing detector arrival times governed by Poisson statistics.

When the probability of the arrival of two gamma counts separated by less than a given time is computed, the controlling parameter is the average countrate. Assuming a countrate near the upper limit encountered in logging while drilling, say 200 counts per second, it has been discovered that less than 2% of the gamma ray pairs will be separated by less than 100 microseconds. This fact, coupled with the discovery that arrival times for shock induced pulses are highly correlated, makes it possible to discriminate between gamma ray induced pulses and shock induced pulses of detector 108. The basic method for discrimination is to reject pairs of pulses separated by less than a predetermined time period and accept pulses that are separated from all other pulses by more than such predetermined time period. It has been found that such predetermined time period for the logging while drilling operations illustrated in FIG. 1 may be selected from a range of 80 to 120 microseconds. Such predetermined time period is preferably about 100 microseconds.

FIG. 2 illustrates schematically the detector assembly 108 including a sodium iodide (NaI) crystal 109 and photo multiplier tube (PMT) 110 which have long been used in the measurement of gamma ray counts in the logging art. The voltage pulses of photomultiplier tube 110 are applied to electronics module 300, specifically the gamma ray counting apparatus 120 of this invention.

Figure 3:
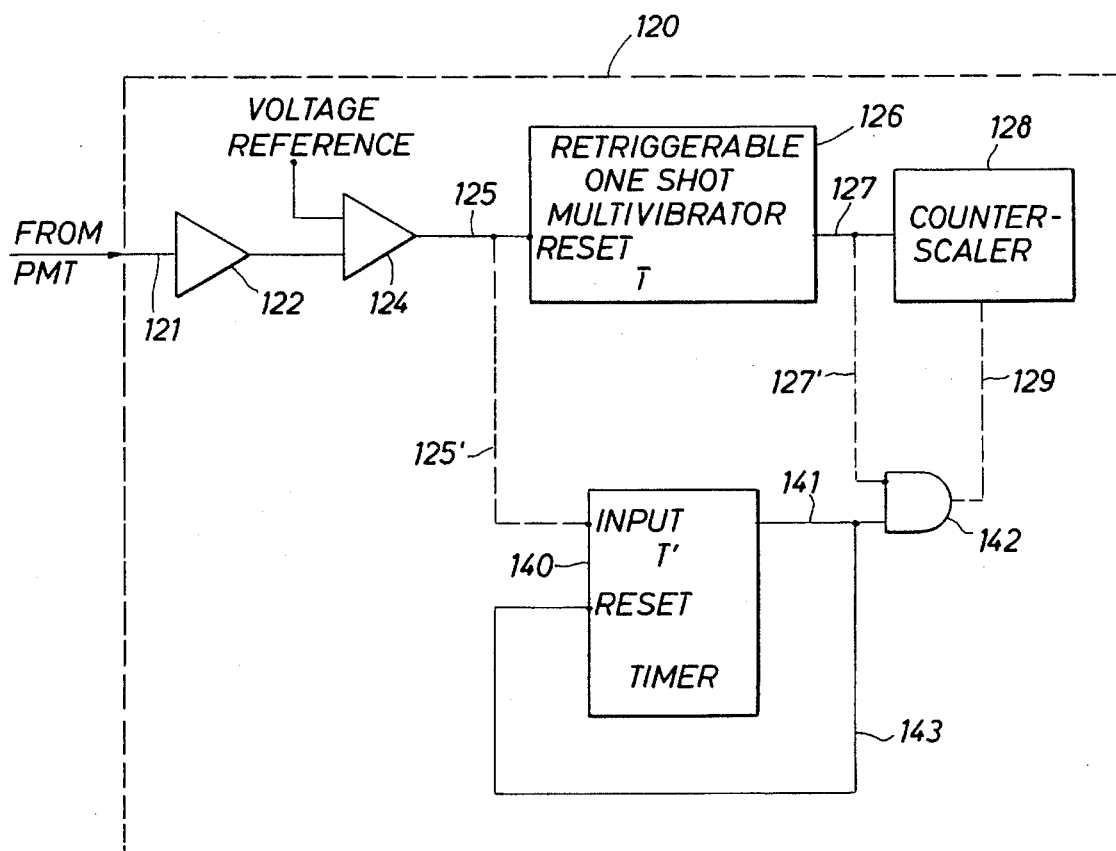
FIG. 3 schematically illustrates a first embodiment of the invention for distinguishing gamma ray induced pulses from shock induced pulses and providing an arrangement for producing a count representative of actual gamma rays striking the NaI crystal of the detector.

FIG. 3 illustrates a first embodiment of such apparatus 120 which receives voltage pulses on lead 121 from the PMT 110. After amplification by integrating amplifier 122 and pulse height discrimination by amplitude discriminator 124, such pulses are applied on lead 125 to a reset lead of one shot multivibrator 126. Such "One Shot" 126 produces an output pulse on lead 127 of a predetermined time length T each time a pulse is received at its reset terminal.

Figure 4:
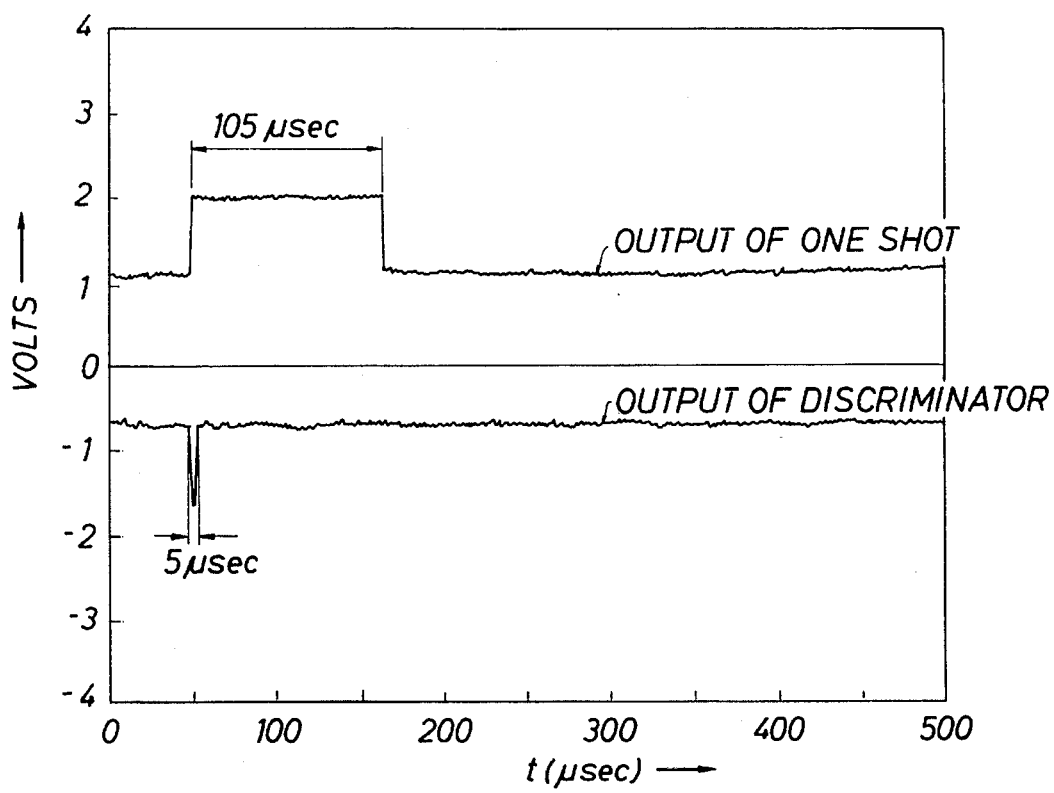
FIGS. 4–6 illustrate output pulses of the PMT and of the apparatus of FIG. 3 under varying conditions of no shock and shock being applied to the detector.

FIG. 4 shows on a lower voltage versus time (in microseconds) trace an input pulse of approximately 5 microseconds long applied on lead 125 to One Shot 126. The One Shot output on lead 127 is also illustrated in the upper trace. The One Shot output is a positive going pulse which is maintained for about 100 microseconds, after the input pulse has been removed. The positive pulse lasts 105 microseconds from the beginning of the input pulse. The example of FIG. 4 is for the case where the detector 108 is not being subjected to shock forces. Accordingly, the five microsecond pulse on lead 125 (typical output pulse of discriminator 124) should be recognized as a gamma ray induced pulse because the output pulse on lead 127 is of a time interval equal to the time period of One-Shot 126.

Figure 5:
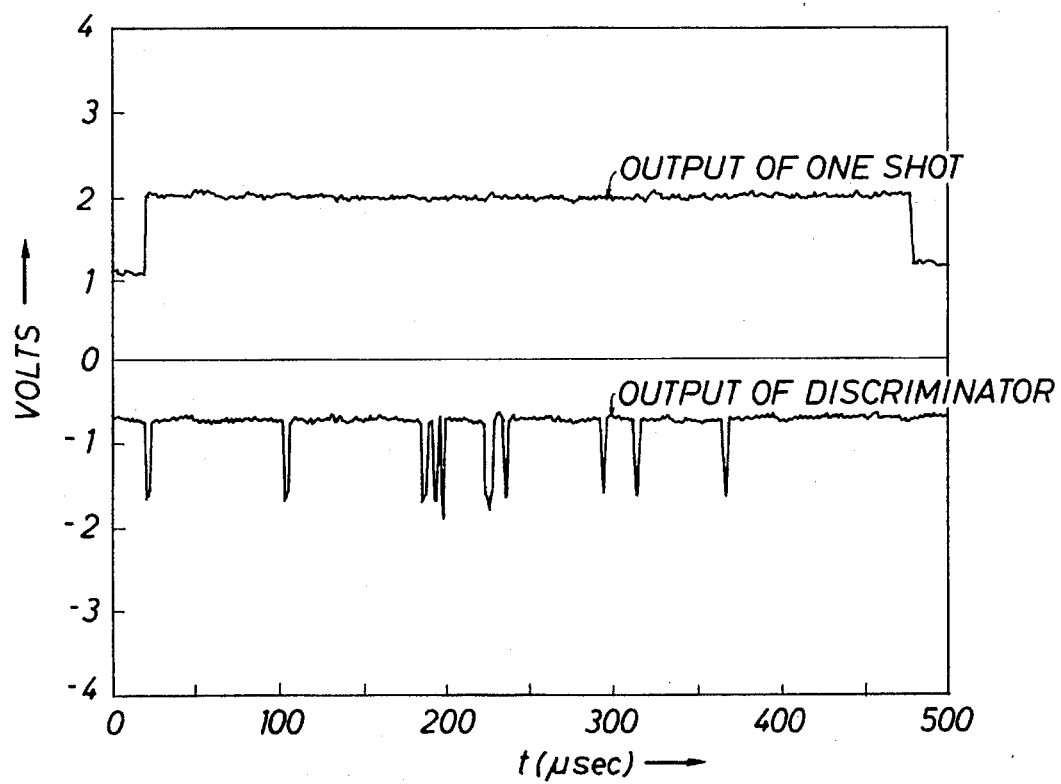
Figure 6:
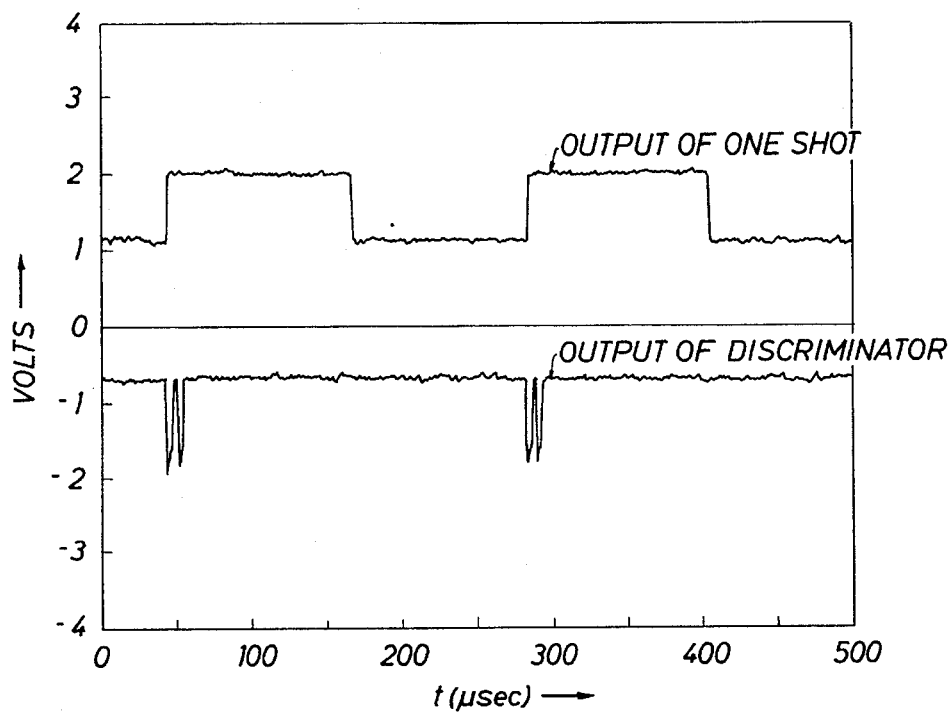

FIGS. 5 and 6 are examples of the output of One Shot 126 where the detector 108 is subjected to high shocks, e.g., 250–300 g. The output pulse on lead 127 from the One Shot circuit has a time width longer than the 105 microsecond length for the single pulse case of FIG. 4. In other words, if a new pulse is applied to One Shot 126 before 105 microseconds have elapsed from the previous input pulse, the One Shot is retriggered from the time of such new pulse.

If the output pulses of One Shot 126 on lead 127 are applied directly to counter 128 (as indicated by the solid line of FIG. 3 between One Shot 126 and counter 128), the effect of contaminating shock counts on the desired gamma ray count is attenuated, but not totally rejected. For example, where a detector 108 is used with shocks applied to the LWD tool for producing approximately 20 counts per shock, and with the one shot circuit 126 provided as in FIG. 3 (solid line 127), the shock induced count rate may be reduced to approximately 3 counts per shock.

The added circuitry of FIG. 3 shown connected by dashed leads 125', 127' and 129 may be provided for the One Shot circuit 126 so as not to apply its output directly to counter 128. Rather, a timer circuit 140 is provided with its input connected directly to the output of discriminator 124 via lead 125'. Timer 140 produces an output pulse on lead 141 after receipt of a pulse on lead 125' and after an elapsed time T' has occurred. The time T' is set to 110 microseconds, whereas the delay time T of One Shot 126 is set to 105 microseconds. As a result, if the pulse on lead 127' is not present and the pulse on lead 141 is present, the logic circuit 142 produces an output count on lead 129 for application to counter 128. In other words, the pulse on lead 127 has occurred and disappeared by the time the pulse on lead 141 has occurred, signifying that the pulse of One-Shot 126 was less than 110 microseconds, for example. As a result, the pulse on lead 129 reflects the occurrence of a gamma ray induced pulse, rather than multiple pulses of shock induced pulses.

When the pulse on lead 141 occurs, it is fed back to the reset lead 143 of timer 140 so as to remove the pulse on lead 141 and re-configure the timer 140 for another pulse. A new pulse on leads 125 and 125' starts the process over such that pulses are created on lead 129 only if a pulse on lead 127 occurs and disappears within 105 microseconds without another pulse having occurred within that time.

Figure 7:
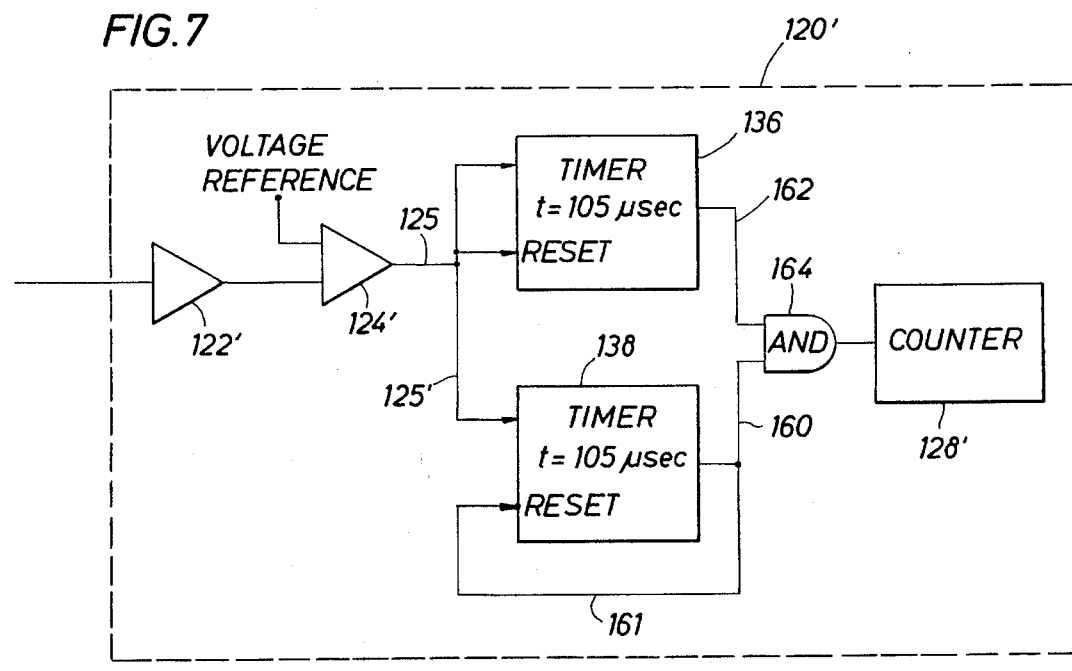
FIG. 7 is an alternative apparatus to that illustrated in FIG. 3 for distinguishing shock induced pulses from gamma ray induced pulses and for counting only those counts which occur after a predetermined time interval from the previous pulse.

FIG. 7 illustrates an alternative circuit to that shown in FIG. 3 for insuring that only those pulses are counted from discriminator 124' which occur after a predetermined interval of time from the previous pulse. The timer 136 is reset and restarted with each pulse on lead 125. The timer 138 is started with a pulse on lead 125', but an output occurs on lead 160 only after the time set for it, e.g., 105 microseconds have elapsed. Immediately thereafter, it is reset by the voltage of its output being applied to its reset terminal via lead 161. When the voltages on leads 162 and 160 are both present, the AND circuit 164 passes a pulse to counter 128' for counting. In other words, a pulse that triggers and resets timer 136 must simultaneously trigger timer 138 and another pulse must not re-trigger timer 136 before timer 138 has produced an output on lead 160.

While two preferred embodiments have been illustrated, many other specific embodiments of circuits to accomplish the function achieved by the embodiments of FIGS. 3 and 7 will occur to one of ordinary skill in the digital circuit art. Each of such circuits will accomplish the function of generating a new counting pulse only if a scintillation detector pulse has not been received in a predetermined interval of time after a previous counting pulse from the scintillation detector has been received.

Various modifications and alterations in the described methods and apparatus will be apparent to those skilled in the art of the foregoing description which does not depart from the spirit of the invention. For this reason, such changes are desired to be included in the appended claims. The appended claims recite the only limitation to the present invention. The descriptive manner which is employed for setting forth the embodiments should be interpreted as illustrative but not limitative.

What is claimed is:

1. Apparatus for distinguishing pulses resulting from gamma rays of a gamma ray detector from shock induced pulses of said detector comprising, means for identifying detector pulses that occur within a predetermined time interval from an immediately adjacent occurring previous pulse as shock induced pulses, and means for identifying detector pulses that occur after said predetermined time interval from an immediately adjacent occurring previous pulse as a gamma ray induced pulse.

2. The apparatus of claim 1 further comprising, means for counting only detector pulses identified as gamma ray induced pulses.

3. The apparatus of claim 1 wherein said predetermined time interval is in a range from about 80 microseconds long to about 120 microseconds long.

4. The apparatus of claim 1 wherein said predetermined time interval is about 100 microseconds long.

5. Gamma ray counting apparatus for a scintillation detector of a logging while drilling system wherein said scintillation detector produces pulses in response to gamma rays and in response to shock forces, said apparatus comprising, means for generating a new counting pulse only if a scintillation detector pulse has not been received in a predetermined interval of time after a previous counting pulse from said scintillation detector has been received, and means for counting each said new counting pulse to determine an estimate of the number of gamma ray induced pulses received by said scintillation detector.

6. The apparatus of claim 5 wherein said predetermined interval of time is in a range from about 80 microseconds long to about 120 microseconds long.

7. The apparatus of claim 6 wherein said predetermined time interval is about 100 microseconds long.

8. The apparatus of claim 5 wherein said means for generating a new counting pulse includes a retriggerable one shot multivibrator which produces an output pulse of said predetermined interval of time in response to an input pulse from said scintillation detector but resets and continues said output pulse to a new predetermined interval of time if an input pulse is received while said output pulse is present.

9. The apparatus of claim 8 further comprising timing circuit means for generating a timing pulse which is of a time interval of a length which includes an increase in time from said predetermined time interval of said output pulse, and logic circuit means responsive to said timing pulse and said output pulse for generating a gamma ray count pulse only if said output pulse is shorter in time than is said timing pulse.

10. The apparatus of claim 9 wherein said increase in time from said predetermined time interval of said output pulse is about 5 microseconds.

11. The apparatus of claim 5 wherein said means for generating a new counting pulse includes, a first timer circuit means, responsive to pulses from said scintillation detector, for generating a first timing pulse only if an input pulse from said scintillation detector has been applied to it and a subsequent input pulse from said scintillation detector has not been applied to it in said predetermined interval of time, a second timer circuit means, responsive to pulses from said scintillation detector, for generating a short duration second timing pulse after said predetermined interval of time has elapsed after an input pulse from said scintillation detector has been applied to it, and logic circuit means for generating a new counting pulse only when said first timing pulse is present simultaneously with said second timing pulse.

12. The apparatus of claim 11 wherein said first timer circuit means includes a first timer circuit having input, reset and output terminals, with its input and its reset terminals both connected to a lead on which pulses from said scintillation detector are applied, such that an output pulse at the output terminal of said timer circuit only is produced after said predetermined interval of time has elapsed from the occurrence of a pulse at its input terminal without another pulse being applied at its input terminal.

13. The apparatus of claim 12 wherein said second timer circuit means includes a second timer circuit having input, reset and output terminals with its input terminal connected to a lead on which pulses from said scintillation detector are applied, and with its output terminal connected to its reset terminal such that said second timer circuit is reset only after an input pulse has been received at its input terminal and said predetermined interval of time has elapsed after said input pulse, such that said second timing pulse occurs for a short period of time on said output terminal and is applied to said reset terminal for resetting said second timer circuit.

14. The apparatus of claim 11 wherein said predetermined time interval is in a range from about 80 microseconds long to about 120 microseconds long.

15. The apparatus of claim 11 wherein said predetermined time interval is about 100 microseconds long.

16. A method for distinguishing pulses resulting from gamma rays of a gamma ray detector from shock induced pulses of said detector comprising the steps of identifying detector pulses which occur within a predetermined time interval from an immediately adjacent occurring previous pulse as shock induced pulses, and identifying detector pulses that occur after said predetermined time interval from an immediately adjacent occurring previous pulse as a gamma ray induced pulse.

17. The method of claim 16 further comprising the step of counting only detector pulses identified as gamma ray induced pulses.

18. The method of claim, 16 wherein said predetermined time interval is in a range from about 80 microseconds long to about 120 microseconds long.

19. The method of claim 16 wherein said predetermined time interval is about 100 microseconds long.

\* \* \* \* \*